June 10, 1969  W. HOUSTON  3,449,043
SPECTACLES FOR USE WITH MONOCULAR AND BINOCULAR INSTRUMENTS
Filed March 3, 1964

Inventor
WILLIAM HOUSTON
By

United States Patent Office 3,449,043
Patented June 10, 1969

3,449,043
SPECTACLES FOR USE WITH MONOCULAR AND BINOCULAR INSTRUMENTS
William Houston, 106 Sunningdale Borrow St./9th Ave., P.O. Box 1949, Bulawayo, Southern Rhodesia
Filed Mar. 3, 1964, Ser. No. 349,046
Claims priority, application Great Britain, Mar. 6, 1963, 8,912/63
Int. Cl. G02c 5/00; G02b 7/02
U.S. Cl. 351—158                         1 Claim

ABSTRACT OF THE DISCLOSURE

A small corrective lens is held in axial alignment at a distance behind one empty lens frame of an otherwise conventional spectacles frame by arms attached to the lens frame, thereby permiting the wearer to bring the ocular lens of an optical instrument close to his eye. The arrangement may be duplicated on the other lens frame for use with binocular instruments.

---

This invention relates to spectacles for use with optical instruments, such as a cystoscope or a microscope, the object of the invention being to provide a construction of spectacles which will enable a person wearing the spectacles which will enable a person wearing the spectacles to use a monocular or binocular instrument with facility while still wearing the spectacles.

It is well known that a person who customarily wears spectacles is usually obliged to remove the spectacles before using a monocular or binocular instrument. The removal of the spectacles is necessitated by the requirement that for proper use of the optical instrument the eye of the viewer should be very close to the viewing lens or lenses of the instrument. The wearing of spectacles renders this requirement difficult, if not impossible, to accomplish, and the incidence and reflection of light from the exterior between the instrument lens and the spectacles and between the spectacles and the eye makes proper viewing through the optical instrument very difficult, if not impracticable, even to a trained person.

To overcome these difficulties and allow the eye to be brought very close to the instrument being used and thus minimise the incidence and reflection of light the present invention provides a construction of spectables in which, in the case where a monocular instrument is employed, one lens is recessed inwardly from the lens frames frame and in the case where a binocular instrument is employed both lenses are recessed inwardly from the main, so that the inwardly recessed lens or lenses lie very close to the eye or both eyes of the wearer depending on the particular case involved. It should be mentioned that in the case where a monocular instrument is employed and only one lens is recessed, it is preferable that the other lens frame is not fitted with a lens.

The invention will be more clearly understood from the following description of one embodiment of the invention given by way of example only with reference to the acompanying drawings in which.

Figure 1:
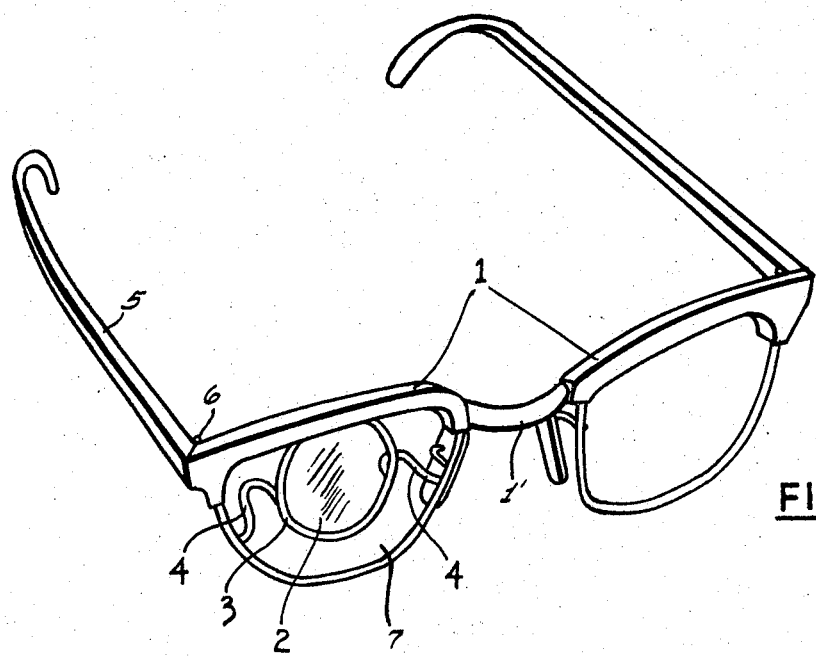
FIG. 1 is a perspective view of the construction of the spectacles.
Figure 2:
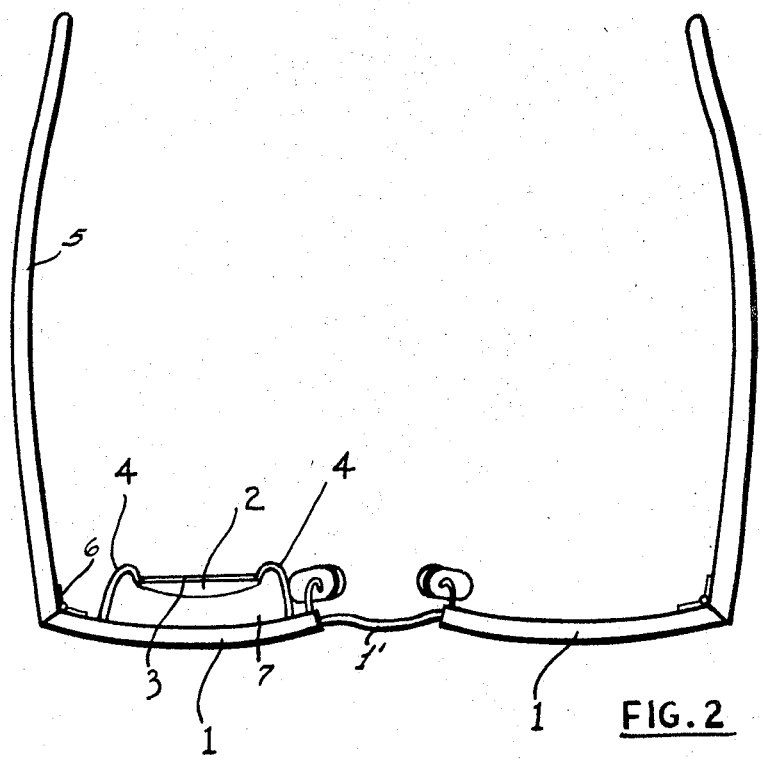
FIG. 2 is a plan view of the construction of the spectacles shown in FIG. 1.

Referring to the drawings, the spectacles consist of two lens frames, connected by a substantially rigid bridge, a lens 2 recessed inwardly from the opening in one lense frame 1 in approximate axial alignment with the same so as to lie very close to the eye of the wearer, the said lens 2 being recessed inwardly by means of a thin lens rim 3 supported on the shorter legs of J-shaped arms 4 projecting inwardly a suitable distance from the associated frame. The longer legs are fastened to horizontally opposite portions of the lens frame, near a plane through the axis of the lens frame, and the connecting bight portions are forwardly open. Elongated temple pieces 5 are fastened by hinges 6 to those portions of the two lens frames 1 which are farthest removed from each other and from the bridge 2, as is conventional.

Although the small lens 2 and the much larger associated lens frame 1 define an open annular passage 7 therebetween, the passage leading into the bight portions of the arms 4 the proximity of the inwardly recessed lens 2 to the eye of the wearer obviates to a great extent the incidence and reflection of light on the eye from the exterior and allows the use of the instrument by the person without the necessity of removal of the spectacles.

Obviously, the spectacles according to the invention will be fitted with corrective lenses to suit the eye-sight of a particular viewer, thereby ensuring considerably more perfect viewing through the optical instrument than if the viewer was obliged to remove the spectacles he normally wears.

I claim:
1. Spectacles for use with a microscope or cystoscope comprising, in combination:
   (a) a spectacle frame including
      (1) two lens frames having respective axes and defining respective axial openings therethrough,
      (2) a substantially rigid bridge member fixedly connecting respective portions of said lens frames,
      (3) two elongated temple pieces, and
      (4) two hinges respectively connecting said temple pieces to portions of said two lens frames farthest spaced from each other and from said bridge member in a normally horizontal direction,
      (5) said temple pieces normally extending from said lens frames in a rearward direction;
   (b) a thin lens rim;
   (c) a small corrective lens mounted in said lens rim and having an axis;
   (d) two J-shaped arm members having each a longer leg portion, a shorter leg portion, and a bight portion connecting said leg portions,
      (1) said longer leg portions having free ends fixedly fastened to respective parts of one of said lens frames opposite each other in said horizontal direction in a plane closely adjacent the axis of said lens frame in a rearward direction,
      (2) said bight portions being open in a forward direction,
      (3) said shorter leg portions having free ends fastened to portions of said thin lens rim substantially diametrically opposite each other in such a manner as to hold said corrective lens entirely rearwardly spaced from said one lens frame and in approximate axial alignment with the same, whereby said lens lies close to the eye of a wearer,

(4) said opening in said one lens frame being substantially greater than said lens rim transversely of said axes, and
(5) said one lens frame and said lens rim defining an open annular axial passage leading in said rearward direction into said bight portions.

References Cited

UNITED STATES PATENTS 1,710,813  4/1929  Drager.

FOREIGN PATENTS 509,954  7/1939  Great Britain.
742,823  1/1956  Great Britain.
642,450  3/1937  Germany.
860,872  10/1940  France.

DAVID H. RUBIN, *Primary Examiner.*

U.S. Cl. X.R.

350—249; 351—41, 154